United States Patent Office 3,544,631
Patented Dec. 1, 1970

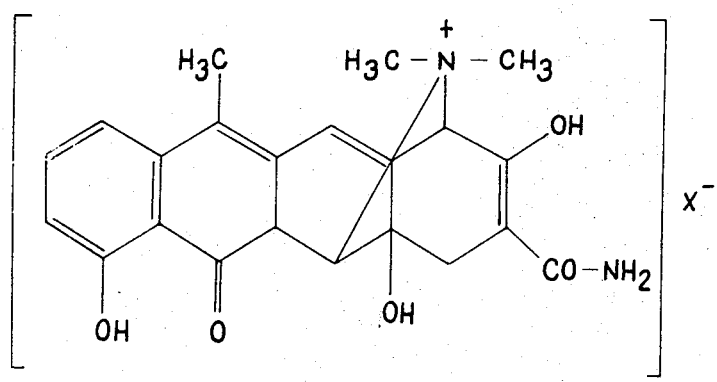
I.
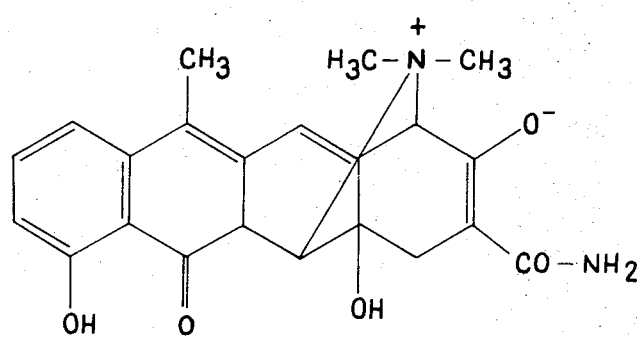
II.
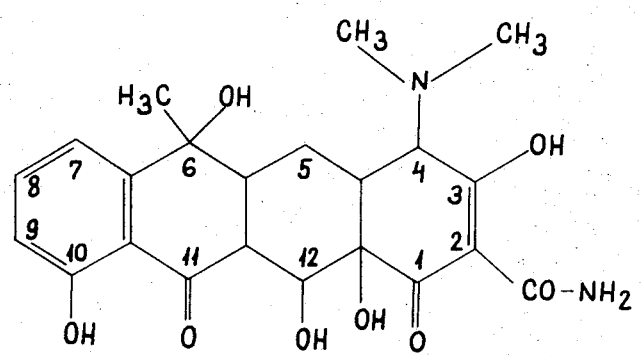
III.

3,544,631
TETRACYCLINE DERIVATIVE INCORPORATING THE BENZENE-SULPHONATE ANION
Sandor Szoke, Peter Szentmiklosi, Agoston David, and Gabor Horvath, Budapest, Hungary, assignors to Chinoin Gyogyszer es Vegyeszeti Termekek Gyara RT.
Filed Aug. 8, 1967, Ser. No. 659,119
Claims priority, application Hungary, Aug. 9, 1966, CI–651; July 6, 1967, CI–651
Int. Cl. C07c 103/19
U.S. Cl. 260—326.3          1 Claim

ABSTRACT OF THE DISCLOSURE

A compound of

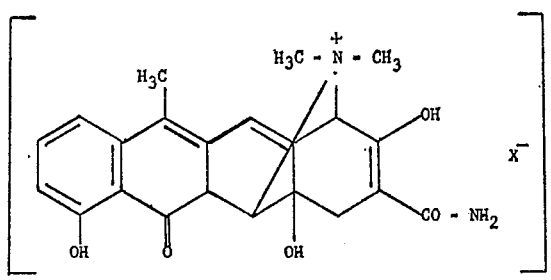

where X is the benzene-sulphonate anion which melts at 228–230° C., and shows absorption maximums at 223–226 m$\mu$ in the UV spectrum and shows absorption bands at 3420, 3370, 1648, 1625, 1573, 1448, 1400, 1388, 1324, 1228, 1180, 1113, 1080, 902, 800 cm.$^{-1}$ in the IR spectrum.

---

This invention relates to new antibiotics. More particularly it is concerned with new derivatives of compounds of the tetracycline type, processes for the preparation thereof and pharmaceutical compositions containing same.

In order to improve the properties of antibiotics of the tetracycline type several chemical modifications have been carried out in the tetracycline molecule. The object has been to prepare derivatives being effective also against resistant strains and to improve the solubility and the stability of the derivatives (see German Pats. 1,063,-598; 1,088,481; 1,076,679; U.S. Pats. 2,812,349; 2,976,-318, etc.).

According to a feature of the present invention there are provided as new compounds the compounds of the presumed formula 4-desdimethylamino-5a,6-anhydro-12-deoxy-[(N-dimethyl)-4,12-aza] - tetracyclinium quaternary salts which might be formed with anions or which might show a betaine-like structure forming inner salts.

The solubility of the new derivatives is favourable, their stability is advantageous. The biological activity of said compounds is particularly valuable, because they are also effective against a number of tetracycline-resistant bacteria in preferable concentrations. Thus the compounds of the present invention are active, e.g., against resistant strains of *E. coli*, Coli dispepsiae, the Klebsiella group, Proteus group, *Staphylococcus aureus*, *Salmonella typhae*, etc.

Several experiments have been carried out in order to clear up the chemical structure of the compounds of the present invention and the following tests seem to be of particular importance:

A new maximum appears in the ultraviolet spectrum of the compounds at a wavelength of 223–226 m$\mu$, which is not present in the starting material. This band indicates the presence of a quaternary group, it is missing from the known 5a,6-anhydro-tetracycline, but it appears, e.g., in the spectrum of the tetracycline-methyl iodide quaternary salt (J.A.C.S. 80, 1654). On titration with boric acid the product does not turn acidic. This substantiates, that no vicinal hydroxy-groups are present in positions 12 and 12a of the molecule of the tetracycline type.

One important representative of the compounds according to the invention is the compound of the Formula I,

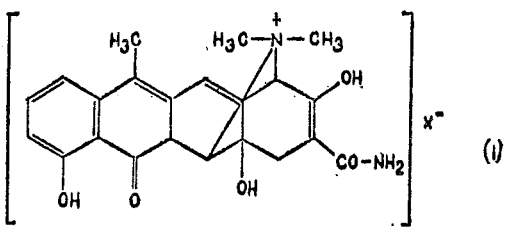

where X is a benzene-sulphonate anion. The melting point of this compound was found to be 228–230° C. (decomp.). The ultraviolet spectrum of the product shows absorption bands at 223–226 m$\mu$. Further derivatives are provided where the benzene sulphonate anion is substituted, e.g., by OH, alkyl or halogen groups.

Another important derivative is the compound of the Formula II

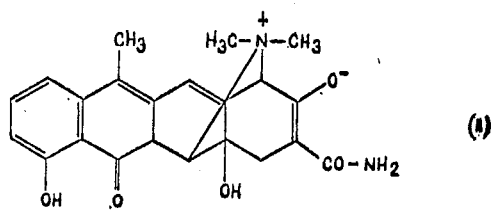

and which is a betain type inner salt, melting at 218–220° C. with decomposition and being soluble in chloroform and acetic acid.

The infrared spectrum of the product may be characterized by absorption bands at the following wave numbers: 3420, 3370, 1648, 1625, 1573, 1448, 1400, 1388, 1324, 1228, 1180, 1113, 1080, 902 and 800 cm.$^{-1}$. The ultraviolet spectrum of the product shows an absorption band at 223–226 m$\mu$.

According to a further feature of the present invention there is provided a process for the preparation of new—assumably—pentacyclic compounds possessing antibiotic activity, which comprises reacting tetracycline-derivatives, in which two hydrogen atoms are attached to the carbon atom in position 5 and an oxo-group is bound to the carbon atom in position 11 (preferably tetracycline, 6 - demethyl-tetracycline or chlorotetracycline) in the presence of a strong acid, preferably hydrochloric acid or benzene-sulphonic acid at a pH value not higher than 2 to yield quaternary salts which possess the postulated formula of 4 - desdimethylamino-5a,6-anhydro - 12 - deoxy - [(N - dimethyl) - 4,12 - aza]-tetracyclines if desired, reacting the compounds thus obtained with a weak base to yield internal salts of 4-desdimethyl - amino - 5a,6 - anhydro - 12 - deoxy-[(N-dimethyl)-4,12-aza]-tetracyclines and if desired converting the products thus obtained into other salts by reacting same with further acids.

As starting material such compounds of the tetracycline group may be used, in which two hydrogen atoms are attached to the carbon atom in position 11. Thus besides tetracycline every above derivative thereof may be used, which is substituted in position 6, 7 and or 8 of the molecule and wherein the substituents are inert from the point of view of the reaction, e.g., halogen or alkyl. Compounds demethylated in position 6 (such as 6-demethyltetracycline) may be used as well.

For the sake of better understanding the structure of the tetracycline molecule is illustrated by Formula III.

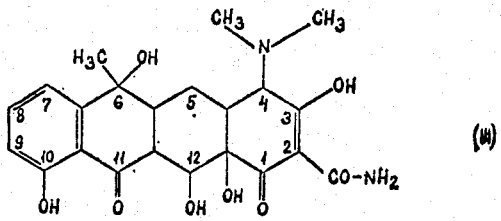

According to a form of realization of the process according to the invention the reaction may be carried out by boiling tetracycline in anhydrous methanol containing 3.5–30% of hydrochloric acid. The reaction may also be carried out without heating, in the presence of a catalyst (e.g., zinc chloride). A particularly stable product which may be advantageously used in therapy may be obtained by using tetracycline hydrochloride as starting material and heating same with a sulphonic acid, preferably with benzene-sulphonic acid or chloro-propane-sulphonic acid in ethanol as medium or with a sulphonic acid ester, preferably with benzene-sulphonic acid ester at a temperature in the range of 110–140° C. The benzene-sulphonates (Formula I) thus obtained may be easily isolated in solid form from the reaction mixture and can be used in therapy without further purification. The products are effective against a number of tetracycline-resistant strains, they are stable and moreover possess favourable solubility. Substituted benzene-sulphonates may also be used and in the products thus obtained substituted benzene-sulphonates are the anions.

The quaternary salts obtained primarily may be converted into the inner salts by reacting with weak bases. If tetracycline was used as starting material, the compound of Formula II is obtained. Neutralization is brought about by reacting with alkalihydrocarbonates such as sodium hydrocarbonate, potassium hydrocarbonate or ammonium hydrocarbonate, alkali acetates such as sodium or potassium acetate or with organic bases such as urothropine. Then urothropine is added to the compounds the solubility in water increases significantly.

When 6-dimethyl-7-chlorotetracycline is used as starting material a benzene sulphonate may be obtained which shows a melting point of 234° C. and which may be converted into the inner salt by using the methods as described above.

According to a further feature of the invention there are provided pharmaceutical compositions comprising as active ingredients at least one of the compounds of the postulated formula 4-desdimethylamino-5a,6-anhydro-12-deoxy-[(N-dimethyl)-4,12-azaltetracyclinium quaternary salts in admixture with a pharmaceutically acceptable diluent or carrier. Said pharmaceutical compositions may be used by way of oral, parenteral or rectal administration. However, they may be applied also for external use, e.g., for the treatment of wounds or for ophthalmological purposes. The pharmaceutical compositions may be used thus in form of tablets, coated pills, powders, solutions, emulsions, suspensions. For parenteral use aqueous or oily solutions are preferred.

Suitable tablets may be formulated by admixture of the active ingredients with known pharmaceutical excipients for example inert diluents, such as calcium carbonate, lactose, calcium phosphate, etc.; disintegrating agents, for example starch or alginic acid; binding agents for example gelatins or acacia mucilage and lubricating agents, for example stearic acid or talc. The tablets may be coated optionally by known methods in order to delay disintegration in the stomach and thus to provide a sustained action over an extended period. The compositions may also contain further therapeutically active substances.

The aqueous suspensions, emulsions, generally contain a sweetening agent (for example glycerine, dextrose, or sucrose) and a flavouring agent (e.g., vanilin). The aqueous suspensions may also contain suitable suspending or thickening agents (e.g., sodium carboxymethyl cellulose); wetting agents (for example condensation products of fatty alcohols with ethylene oxide) and preservatives (for example methyl- or propyl-p-hydroxy-benzoate).

The sterile injectable preparations may contain preservatives, such as methyl- or n-propyl-p-hydroxy benzoate.

Further details of our process are to be found in the examples; it is, however, by no means intended to limit the invention to the examples.

It must be emphasized that great care was taken to evaluate the chemical structure of the new compounds showing activity against resistant strains, however it well might be that further observations of the field may suggest further or different formulae for the products. The inventive conception of the present application comprises mainly the new products, their way of preparation and application the evaluation of structure being an additional step having primarily scientific value.

EXAMPLE 1

5 g. tetracycline hydrochloride are heated with 20 ml. of benzenesulphoethylester at a temperature of 135–140° C. for 5 minutes. Crystals appear which are filtered on cooling to 25° C. and adding 40 ml. of acetone. The crystals are dried in vacuo at 35–40° C. 5.5 g. of a product are obtained the structure of which is presumably 4-desdimethylamino - 5a,6 - anhydro-12-deoxy-[(N-dimethyl)-4,12-aza] - tetracyclinium benzene-sulphonate. M.P.: 229–230° C. (decomp.) Analysis: C%=57.95; H%=4.89; N%=4.91; S%=5.43.

The following experiments seem to be important for supporting the chemical structure of the compounds: When boiling with concentrated sodium hydroxide no dimethylamine is split off. The corresponding derivative can not be obtained when using as starting material 12a-deoxy-desdimethyl-aminotetracycline, or oxytetracycline. The reaction can not be accomplished in presence of boric acid which is capable to give complexes with the vicinal hydroxyl groups of the tetracycline molecule (C12–C12a). The UV spectrum of the product shows a new maximum when compared with the spectrum of the starting material. This maximum appears at 223–226 m$\mu$ and is lacking from the spectrum of the known 5a,6-anhydro-tetracycline. The product is not turning acidic when titrated with boric acid.

The product is effective against bacterium strains being resistant against tetracycline, e.g.:

Resistant strain—concentration.
Staphylococcus aureus res.—0.25–0.5 $\gamma$/ml.
Streptococcus faecalis res.—1 $\gamma$/ml.
Salmonella typhae—1 $\gamma$/ml.
Proteus group—2 $\gamma$/ml.
Klebsiella group—4–8 $\gamma$/ml.
Coli (dispesiae or E. coli)—5–5 $\gamma$/ml.

EXAMPLE 2

5 g. of the benzene sulphonate prepared according to Example 1 are stirred in 30 ml. of water for 15 minutes at room temperature in the presence of 3 g. of NaHCO$_3$. The precipitate is filtered and dried. 3.8 g. of the inner salt of 4-desdimethylamino-5a,6-anhydro-12 deoxy-[(N-dimethyl)-4,12-aza]-tetracyclinium are obtained in the form of crystals. M.P.: 218–219° C. (decomp.) $(\alpha)_D^{25}$=−146 (in dimethylformamide). Analysis: C%=59.65; H%=5.12; N%=6.4. The reaction may be brought about using as medium aqueous dimethylformamide or methanol. Sodium-acetate may be used instead of NaHCO$_3$. The infrared spectrum of the compound shows the following bands: 3420, 3370, 1648, 1625, 1573, 1448, 1400, 1388, 1324, 1228, 1180, 1113, 1080, 902, 800 cm.$^{-1}$. The product shows similar biological activity as the product of Example 1.

EXAMPLE 3

5 g. tetracycline are reacted with 1.5 g. 3 chloropropane-sulphonic acid (1) in 20 ml. of n-vutanol at 115° C. for 5 minutes. On obtaining a clear solution the reaction mixture is cooled to 60–70° C. and poured into 100 ml. of terc. butanol while stirring intensively. A yellow precipitate appears which is filtered and dried at 35–40° C. This powder is dissolved in 50 ml. of n-butanol and boiled for 5 minutes with 0.9 ml. of piperazine. Yellow needle crystals appear which are filtered and dried at 35–40° C. in vacuo. 4.3 g. of the inner salt of 4-desdimethylamino - 5a,6 - anhydro - 12 - deoxy-[(N-dimethyl)-4,12-aza]-tetracyclinium are obtained. M.P.: 228–230° C. (decomp.). Analysis: C%=61.20; H%=5.10; N%=6.64.

EXAMPLE 4

5 g. TC.HCl are suspended in 100 ml. n-octyl-alcohol and 5 g. benzene-sulphoethylester are added. The reaction-mixture is heated for 15 minutes at 113° C., whereupon alcohol is eliminated. On cooling 150 ml. of acetone are added to precipitate the crystals which appear in the form of needles. 5.5 g. of the benzene-sulphonate described in Example 1 are obtained. M.P.: 229–230° C. (decomp.). Analysis: C%=58.20; H%=5.0; N%=5.10; S%=5.43.

EXAMPLE 5

5 g. TC.HCl and 1.5 g. 1.3 propane-sultone are heated in 25 ml. n-butanol at 110° C. for 30 minutes. The reaction mixture is cooled to 30° C. and 55 ml. of terc.-butanol are added to precipitate 5.2 g. of a salt appearing in the form of yellow crystals. M.P.: 219° C. (decomp.). Analysis: C%=53.27; H%=5.41; N%=4.77; S%=5.70. On addition of picric acid a crystalline precipitate is obtained. M.P.: 190° C. (TC picrate M.P. 170° C.). When boiled with sodium-hydroxide (40%) no dimethylamine is split off. The product is effective against tetracycline-resistant strains.

EXAMPLE 6

80 mg. of 6-demethyl-chlorotetracycline HCl are heated for 10 minutes with 1 ml. benzene-sulphoethylester at 120–130° C. A solution is obtained, however new crystals appear already while the reaction mixture is still hot. On cooling to 20° C. 2 ml. acetone are added. After stirring for 5 minutes the product is filtered and dried at 60° C. 57 mg. 4 - desdimethylamino - 5a,6 - anhydro-12-deoxy-6-demethyl - 7 - chloro - [(N-dimethyl)-4,12-aza]-tetracyclinium benzenesulphonate are obtained. M.P.: 234° C. (decomp.). Readily soluble in dimethylformamide. Analysis: C%=58.40; H%=5.01; N%=5.10; S%=5.22. Biologically active similarly to product of Example 1.

EXAMPLE 7

4.8 g. TC.HCl and 4.8 g. p-dichloro-acetamido-benzenesulphonic acid ethylester are heated with 20 ml. n-butanol for 10 minutes at 135–140° C. The crystals are filtered on cooling and washed with 10 ml. of acetone. M.P.: 226–228° C. (decomp.). $[\alpha]_D^{25}$=—302 (in dimethylformamide) Cl%=10.1. 5.4 g. of 4-desdimethylamino-5a,6 - anhydro - 12-deoxy-[(N-dimethyl)-4,12-aza]-tetracyclinium p-dichloro-acetamidobenzenesulphonate are obtained. Biologically active similarly to product of Example 1.

EXAMPLE 8

5 g. tetracycline are heated to 116–120° C. with 2.5 g. benzenesulphonic acid in 20 ml. of butanol. The reaction mixture is cooled to room temperature and the precipitated crystals are filtered and dried. 5.2 g. of 4-desdimethylamino - 5a,6 - anhydro - 12-deoxy-[(N-dimethyl)-4,12-aza] - tetracyclinium benzene - sulphonate are obtained. $[\alpha]_D^{25}$=—308 (in dimethylformamide). C%=57.81; H%=5.01; N%=4.80; S%=5.5. M.P.: 222° C. (decomp.).

EXAMPLE 9

5 g. of the benzenesulphonate obtained according to Example 1 are stirred for 10 minutes in 50 ml. methanol with 1.5 g. of hexamethylenetetramine.

On refluxing for 5 minutes 2.5 ml. of water are added. The precipitate is filtered and dried. 4 g. of the betaine according to Example 2 are obtained. M.P.: 218–220° C. (decomp.). $[\alpha]_D^{25}$=—128 in dimethylformamide. N%=6.2.

EXAMPLE 10

5 g. of TC.HCl are added to a solution of 5 g. of $ZnCl_2$ in 30 ml. of cc. HCl while cooling. On stirring for 15 minutes at room temperature the crystals are filtered and dried. 4.5 g. of 4-desdimethylamino-5a,6-anhydro-12-deoxy - [(N-dimethyl)-4,12-aza]-tetracyclinimumchloride are obtained. The UV-spectrum of the product shows at 223–226 m$\mu$ a maximum (in methanol) M.P.: 218–220° C. (decomp.). Cl%=7.1; $[\alpha]_D^{25}$=—270° (in dimethylformamide). Biologically active similarly to product of Example 1.

EXAMPLE 11

The following composition is finished by the usual methods in the form of 1 g. tablets for oral administration.

| | Mg. |
|---|---|
| Product of Example 1 | 270 |
| Aneurine HCl | 1.50 |
| Riboflavine | 2.50 |
| Pyroxide.HCl | 0.50 |
| Nicotamide ad 1 g. | 25 |

EXAMPLE 12

0.05 g. of the product of Example 1 is admixed with a vaseline type ointment and finished in tubes of 5 g. for external use.

EXAMPLE 13

0.5 g. of the product of Example 1 are admixed with 0.5 g. of methyl-p-oxy-benzoate and 9.0 g. of lactose to give a powder mixture which may be used for the external treatment of wounds.

EXAMPLE 14

0.15 g. of the product of Example 1 are admixed with 0.05 g. of hydrocortison acetate in a vaseline type ointment and finished in tubes of 5 g.

EXAMPLE 15

A powder mixture for oral use is prepared by finishing the following ingredients by usual methods of ad 1 g.:

| | G. |
|---|---|
| Product of Example 1 | 0.10 |
| Aneurine HCl | 0.0006 |
| Pyridoxine HCl | 0.0002 |
| Nicotamide | 0.01 |

EXAMPLE 16

250 mg. of the product of Example 1 are finished in resorbable capsules by the usual methods of oral use in human therapy.

What is claimed is:
1. A tetracycline derivative of

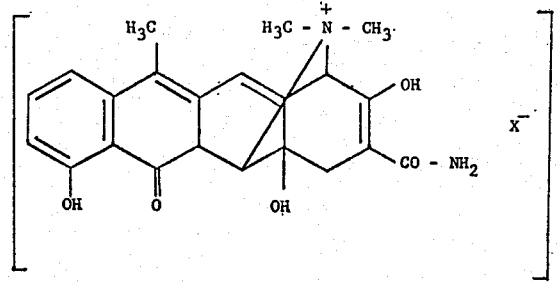
wherein X stands for the benzene-sulphonate anion.
References Cited
UNITED STATES PATENTS
2,832,718   4/1958   Weiderheimer et al.
                                                    260—559 AT
ALEX MAZEL, Primary Examiner
A. M. T. TIGHE, Assistant Examiner
U.S. Cl. X.R.
260—559; 424—227, 274